(12) United States Patent
Fielding et al.

(10) Patent No.: US 12,281,944 B2
(45) Date of Patent: Apr. 22, 2025

(54) STRUCTURE FOR SIMULATING A THERMAL IMAGE (71) Applicant: Raider Targetry Pty Ltd, Kunda Park (AU)

(72) Inventors: Michael Fielding, Geelong (AU); Cody Webster, Burwood (AU)

(73) Assignee: Raider Targetry Pty Ltd, Kunda Park (AU)

( * ) Notice: Subject to any disclaimer, the term of this patent is extended or adjusted under 35 U.S.C. 154(b) by 513 days.

(21) Appl. No.: 17/627,851

(22) PCT Filed: Jul. 18, 2019

(86) PCT No.: PCT/AU2019/050755
§ 371 (c)(1),
(2) Date: Jan. 18, 2022

(87) PCT Pub. No.: WO2021/007606
PCT Pub. Date: Jan. 21, 2021

(65) Prior Publication Data
US 2022/0316952 A1 Oct. 6, 2022

(51) Int. Cl.
*G01J 5/48* (2022.01)
*F41J 1/08* (2006.01)
*F41J 2/02* (2006.01)

(52) U.S. Cl.
CPC . *G01J 5/48* (2013.01); *F41J 1/08* (2013.01); *F41J 2/02* (2013.01)

(58) Field of Classification Search
CPC . F41J 1/08; F41J 2/02; G01J 5/48; G01J 5/53
See application file for complete search history.

(56) References Cited

U.S. PATENT DOCUMENTS

| 4,253,670 | A |   | 3/1981 | Moulton et al. |
| 5,110,137 | A | * | 5/1992 | Watkins ............ F41J 2/02 273/348.1 |
| 5,238,406 | A |   | 8/1993 | Littell, III |

(Continued)

FOREIGN PATENT DOCUMENTS

| DE | 3832534 A1 | 4/1990 |
| EP | 0640809 A1 | 3/1995 |
| FR | 2544067 A1 | 10/1984 |

OTHER PUBLICATIONS

European Search Report for Application No. 19937798.7-1015 / 3999797 PCT/AU2019050755 dated Apr. 14, 2023.

(Continued)

*Primary Examiner* — David E Smith
*Assistant Examiner* — Hsien C Tsai
(74) *Attorney, Agent, or Firm* — MARSHALL, GERSTEIN & BORUN LLP; Michael P. Furmanek (57) ABSTRACT A structure (10) for simulating a thermal image generated by a real world object, the structure (10) comprising a body (22), (24), (26) and (28) having at least one cavity (106), and at least one inlet opening into the cavity (106) for receiving a flow of fluid medium into the cavity (106). The fluid medium having a temperature that differs from ambient. The cavity (106) having internal configurations defining flow paths for the fluid medium to cause temperature variations on an external surface (26) of the body to simulate the thermal image of the real world object.

19 Claims, 5 Drawing Sheets (56) References Cited

U.S. PATENT DOCUMENTS 5,751,006 A * 5/1998 Cooper ............... F41J 2/02
                                                250/493.1
2015/0159980 A1   6/2015 Falcou et al.

OTHER PUBLICATIONS

International Search Report and Written Opinion issued to International Application No. PCT/AU2019/050755, dated Aug. 8, 2019.

* cited by examiner

STRUCTURE FOR SIMULATING A THERMAL IMAGE

CROSS-REFERENCE TO RELATED APPLICATION

This is the United States national phase of International Patent Application No. PCT/AU2019/050755, filed Jul. 18, 2019, the entire contents of which is hereby expressly incorporated herein by reference.

FIELD OF THE INVENTION

The invention relates to the simulation of thermal images generated by real world objects that have a known or 'signature' thermal image. The real world objects include military equipment, such that the simulation of their signature thermal images may be used during targeting exercises.

BACKGROUND OF INVENTION

Objects have a thermal image in the same way they have a visible image. A visible image is light (electro-magnetic (EM) radiation) in the visible spectrum reflected or emitted from the object. Likewise, the EM radiation in the infrared (IR) spectrum reflected or emitted from an object creates a thermal image. With a suitable filter, this IR image (viewed through a suitable IR sensor) can be converted to the visible spectrum for human viewing.

This has many useful applications, in particular military use for locating targets at night or low-light environments. Thermal imaging during the day is also useful for locating camouflaged targets and even indicating the operational modes of target vehicles and equipment.

Military training operations will often use a mock-up or basic replica of targets rather than the associated real world equipment, as the use of real world equipment is usually cost prohibitive and logistically onerous. While it is relatively simple to replicate the visible image of a target, the specific thermal image (or so-called 'thermal signature') of a target is more difficult to simulate. Target vehicles such as tanks, will have quite detailed thermal signatures caused by the heat from the engine, friction between the wheels and the tracks, heated muzzle from firing shells and so on. Distinguishing between enemy vehicles and friendly vehicles is critical in battle zones and so practice targets that give accurate thermal images which distinguish between these vehicles can educate military personnel so that during battle, there is a reduced likelihood of fire being directed at friendly vehicles.

The heat signatures of an enemy tank versus a friendly tank may only be distinguished if the thermal images have enough resolution to reveal certain tell-tale features. For example, simulated thermal images ideally need to be of sufficient detail such that an observer can view and identify specific features that in turn can be used to identify the design or type of the vehicle. Such features may include for example, the number and placement of road wheels, the size and general shape of the vehicle, the presence or absence of gun barrels and antennae. Many other features could also be important in determining the design or type of vehicle.

It is difficult however, for existing targets to simulate a detailed thermal signature in a cost effective structure. The targets in a live fire operation can often be engaged by 100 to 200 rounds or more before being replaced. The targets are considered to be high consumption products or devices. Accordingly, there is a cost incentive to keep the target structure as cheap and simple as possible. As a result, targets such as those described in U.S. Pat. No. 4,253,670 are placed in the field with an internal heat source (i.e. a kerosene burner or similar). Air heated by the internal heat source eventually fills the interior of the target structure causing the temperature of the exterior surfaces to be heated in a relatively uniform manner. Unfortunately, this creates a thermal image of large, featureless shapes. This lack of detail is a poor approximation of the thermal signature that the real world object would have and personnel are therefore unlikely to be able to familiarise themselves with all the tell-tale features that normally characterise particular targets.

Reference herein to U.S. Pat. No. 4,253,670 or other matter which is given as prior art is not to be taken as an admission that the disclosure of U.S. Pat. No. 4,253,670 or other matter was known or that the information disclosed was part of the common general knowledge as at the priority date of any of the claims.

Throughout the description and claims of the specification, the word "comprise" and variations of the word, such as "comprising" and "comprises", is not intended to exclude other additives, components, integers or steps.

SUMMARY OF INVENTION

One aspect of the invention provides a structure for simulating a thermal image generated by a real world object, the structure comprising:
  a body having at least one cavity;
  at least one inlet opening into the cavity for receiving a flow of fluid medium into the cavity, the fluid medium having a temperature that differs from ambient; wherein
    the cavity having an internal configuration for the fluid medium to cause temperature variations on an external surface of the body that simulates the thermal image of the real world object.

A structure of the above kind can more accurately replicate the thermal image of the associated real world object compared to the known prior art, by receiving a fluid medium in the form of a liquid or a gas into the cavity and by the fluid medium travelling within the cavity according to the configuration of the flow path in the cavity interior. The careful selection of the construction of the cavity allows the fluid medium to heat or cool the exterior surface of the structure in a manner that the temperature profile on the exterior surface more closely mimics the thermal signature of the real world object intended to be mimicked. The fluid medium may be hotter or colder than ambient temperature, and fluid media of differing types and/or temperatures can be used.

Another aspect of the invention provides a method of simulating a thermal image generated by a real world object, the method comprising:
  a. providing a structure comprising a body having at least one cavity, the body having at least one inlet opening into the cavity for receiving a flow of fluid medium into the cavity, the cavity having an internal configuration for the fluid medium to cause temperature variations on an external surface of the body that simulates the thermal image of the real world object.
  b. delivering fluid medium to the inlet cavity, the fluid medium having a temperature that differs from ambient.

The structure can include a detachable support for supporting the structure in a defined orientation, such as being supported in an upright orientation. The support can take any suitable form. For detachable engagement, the body can include posts that are accepted into openings in the support. Alternatively, the support can include posts that are accepted into openings in the body. The support can be in the form of a long beam that extends from one end of the body to the other.

The support can facilitate delivery of fluid medium to the cavity inlet and so the support can include a delivery conduit and at least one fluid medium outlet. The support can be hollow and the delivery conduit can be the interior of the support. The arrangement can be such that the cavity inlet or each cavity inlet is in registration with a respective outlet of the support. This arrangement facilitates delivery of fluid medium into the cavity or cavities of the structure though the support, so that the structure is not itself required to include an inbuilt heat source or sources (such as is described in U.S. Pat. No. 4,253,670). This can make a structure according to the invention cost effective compared to targets that require inbuilt heat sources. In particular, the use of inbuilt heat sources will almost certainly also require associated heat shielding as a way of controlling the dissipation of heat within the body within which the heat sources are employed. Moreover, inbuilt heat sources used in target structures will eventually be destroyed during target training which adds to the cost of replacing the target structure.

The support can be mounted on wheels or skids to allow the structure to be towed or dragged in order to create a moving target.

The support or the body can connect to a conduit that supplies the fluid medium. The conduit can extend to a supply of fluid medium that is spaced from the support or the body. In structures used for target training, the supply of fluid medium can thus be spaced or placed away from the target area and accordingly, can be protected from fire or a blast radius. Where the fluid medium is heated air, the heater can thus be protected and not destroyed as the target structure is destroyed.

The supply of fluid medium can be a remote supply, such as being part of a towing vehicle or trailer and the towing vehicle or trailer can connect to the support or the body by a draw bar. The conduit can extend from the towing vehicle or trailer to the support or the body via the drawbar. In this arrangement, hot air can be produced in the towing vehicle or trailer and is delivered along the draw bar and to the support or the body such as by fan force.

The structure can be comprised of two or more bodies that each includes a cavity. Each body can include more than one cavity. For example, a body can have a lower cavity and an upper cavity. Alternatively, a body can have a two or more cavities side by side. A pair of cavities can share a wall. Alternatively, the walls defining multiple cavities within a body can be spaced apart. The spacing between a pair of walls of adjacent cavities can form a flow path for the passage of a fluid medium within the body. For example, a pair of side by side lower cavities can exhaust fluid medium into one or more upper cavities and for this, one or more of the lower cavities can share a wall with one or more of the upper cavities and an inlet can extend through the shared wall for flow between the lower and upper cavities. Alternatively, the walls of a pair of side by side lower cavities might be spaced apart to allow flow of fluid medium into an upper cavity above the lower cavities.

Where the structure is comprised of two or more bodies that each includes a cavity, the bodies can be positioned closely and adjacent to each other and can form segments of a structure such as a military vehicle; a tank for example. The segments can form front, middle and rear sections of a tank for example.

The body can be made to have the general physical appearance of the real world object it is to mimic from one viewing aspect. In the example of a tank, the body could have the same general physical appearance of the side of the tank, or of the front or rear of the tank, being whichever the style of military training requires. However, the body often needs only to be generally 2 dimensional, as it is only viewed from one side during the training exercises. That is, a full 3 dimensional replica of a tank or other vehicle or object is usually not required, although the present invention includes both 2 dimensional and 3 dimensional real world objects. For example, a 3 dimensional replica of a tank or other vehicle could be useful if the structure is to be used as a target for aerial practice, i.e. where the target would be fired upon from above.

The cavities can have any suitable internal configuration. The cavity can have an internal configuration that defines flow paths for the fluid medium to cause temperature variations on an external surface of the body that simulates the thermal image of the real world object. The configuration can be one in which flow though the cavity is slow so that the fluid medium is retained in the cavity for an extended period. Alternatively, the configuration can promote faster flow though the cavity. The cavity can have just one inlet or multiple inlets. The cavity can have one or more outlets to exhaust the fluid medium that enters the cavity. The cavity can have the same number of inlets and outlets, or there can be different numbers of inlets to outlets. The inlets can be of different size to the outlets. The inlet of a cavity for example might be larger than the outlet of the cavity to promote retention of fluid medium within the cavity. The inlets can have nozzle or port connections to connect with the nozzle or port connections of fluid medium supply conduits.

Where the cavity includes one or more outlets, the outlets can exhaust to outside of the body.

Where the cavity includes outlets to exhaust the fluid medium, the outlets can be provided by perforations in a wall of the cavity, which can be a wall of a body that the cavity is within. The size and frequency of perforations could be used to adjust the temperature gradient. Additionally, where the perforations extend through a wall of a body, the fluid medium exhausting through the perforations would transfer more of the thermal energy of the fluid medium to the external surface of the body due to the passage of the fluid medium through the body wall.

Also, where the structure includes multiple bodies or segments, altering the number of perforations between the different bodies or segments allows better control of the temperature gradient as required to generate the desired thermal image.

The cavity can have a wall section with areas of differing thermal conduction that contributes to the desired temperature variations on the exterior surface of the structure. Optionally, the wall section has variable thickness. In another option, the wall section has areas of differing wall material, such as material having differing conductive properties. In some embodiments, the differing wall material is a coating material with prescribed thermal properties.

Where the structure has a generally planar configuration, the body or bodies have a front face, which can be the face that is intended to be viewed and a back face spaced from the front face, but parallel to the front face. The cavities within the body or bodies can be defined by inside surfaces of the front and back faces so that the cavities have planar and parallel inside facing surfaces. This means that the flow paths between the front face and the back face is in a direction that is generally parallel to the front and back faces. This relatively narrow planar structure promotes fluid flow that is predominantly 2 dimensional within the cavities, which is more predictable and easier to configure than 3 dimensional or turbulent fluid flow.

In some embodiments, the front and back faces are provided by planar sheet material separated by a core structure, which together define the one or more cavities within the structure. Preferably, the core defines the location of the inlet or each inlet for receiving the fluid medium.

In some forms, the front and back face are formed of plywood sheets. In other forms, the front and back face may be formed of metal, plastic or laminations of different materials.

Preferably, the core is formed by, but is not limited to one or more of the following:
Cork;
Pressed saw dust;
Recycled coconut husk/shells;
Metal;
Polymer;
HDPE (High-density polyethylene) and
Laminates including one or more of the above Other embodiments involve forming the front or the back faces as a 3 dimensional mould, such that the moulded profile configurations provide the necessary spacing between the front and back faces. Alternatively, the front and back faces may both be 3 dimensional moulds that are mutually complementary and join to form a generally planar structure.

As described above, the structure can be made up of a plurality of individual segments, each of the segments being separately and detachably engageable with the support. With the structure provided as several separate segments simultaneously supplied with a fluid medium from the support, individual segments can be reused if they are not damaged during the targeting exercise. The undamaged segments from a collection of the used target structures can be reused or reconfigured as appropriate to provide another usable target at no additional cost. Also, some segments can be repaired if not too damaged during target training, by patching over large holes. While this might not fully return the damaged segment to its original state, importantly, the flow paths of the fluid medium within the cavity can be returned to an approximation of the designed flow paths.

Moreover, a further advantage of the present invention is that the structure does not employ any electrically powered componentry so that there are no electrical paths to be maintained, such as across the target surface of the structure. The structure of the invention can thus slowly degrade rather than having an immediate or instant failure (which could be a failure to produce a thermal image at all) upon an electrical path being severed or a fuel source to interrupted.

Another important advantage of the modular nature of using individual target segments is the ease of handling and manually assembling the target in the field by soldiers. Each segment is considerably lighter than the full target making it easier to insert the mounting struts into the relevant apertures in the support.

More than one fluid media can be employed to achieve the simulated thermal image or signature that is required. For example, one form of fluid media can be introduced into a first cavity and a second and different form of fluid media can be introduced into a second cavity. The first form of fluid media might, for example be a liquid, while the second form of fluid media might be a gas. Alternatively, the same form of fluid media might be introduced into both of the first and second cavities but at different temperatures.

BRIEF DESCRIPTION OF DRAWINGS

Preferred embodiments of the present invention will now be described by way of example only with reference to the accompanying drawings, in which:

FIG. 9b shows a unitary core insert used in the segment of FIG. 9a.

DETAILED DESCRIPTION OF THE DRAWINGS

Figure 1:
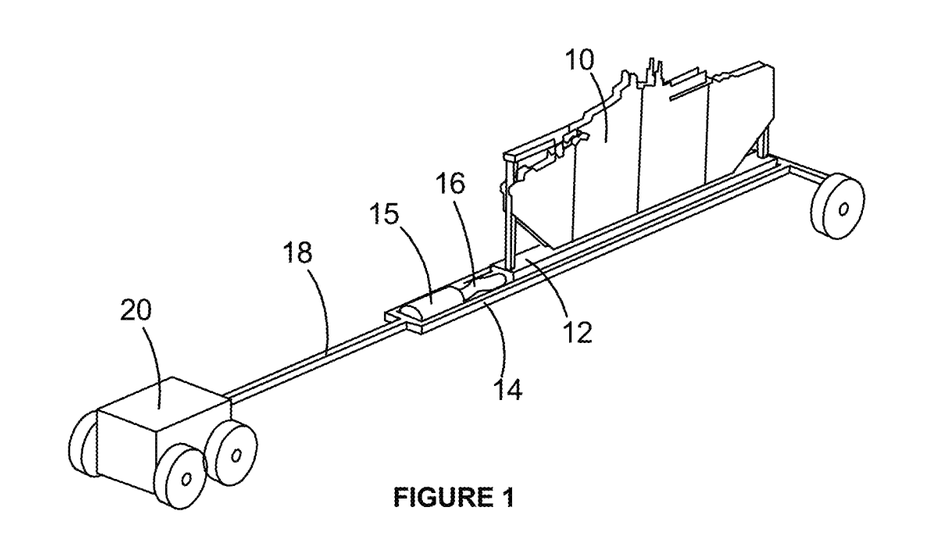
FIG. 1 shows a perspective view of a target structure according to the present invention detachably mounted on a trailer and towed by a driverless tractor.
Figure 2:
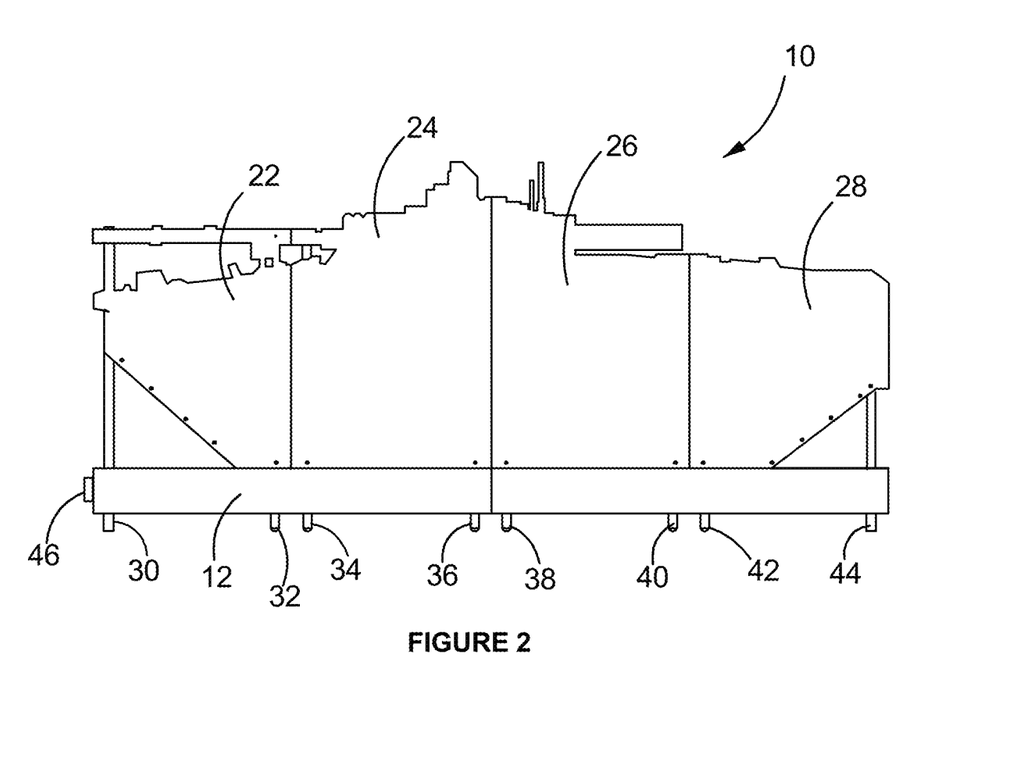
FIG. 2 shows a side view of the target structure of FIG. 1.

FIG. 1 shows a target structure 10 including a detachably mounted support channel 12 and secured to a trailer 14 pulled by a towing vehicle 20. A draw bar 18 connects between the trailer 14 and the towing vehicle 20. The towing vehicle 20 can take any form and operates to tow the target structure 10 into a desired position, or it can be used to move the target structure 10 during a military exercise in which it is employed if the real world object the target structure 10 is to mimic is mobile, such as a tank.

A thermal generator 15 supplies a heated fluid, such as hot air to the hollow channel support 12 via the flexible conduit 16.

FIGS. 2, 3, 4 and 5 show the target structure 10 and the hollow support 12 in isolation. The target structure 10 is formed to have a structure to mimic a military tank. The target structure 10 is made up of a body comprising separate segments 22, 24, 26 and 28 that each have engagement elements 30 to 44 (in increments of 2) to detachably mount to the support 12. The engagement elements 30 to 44 pass completely through the support 12 as shown in the figures and that can be enough for the engagement elements 30 to 44 to be secured to the support 12 if the openings in the support 12 through which the engagement elements 30 to 44 pass form a relatively tight or snug fit with the engagement elements 30 to 44. Alternatively, additional securing arrangements can be employed.

The support 12 comprises an inner core that is clad by two insulation cladding sections 64 and 66. The cladding sections 64 and 66 reduce the amount of infra-red energy radiated from the support 12, which could otherwise appear hotter than the segments 22, 24, 26 and 28 it supports given that the support 12 receives heated fluid from the heat source before it is ported to the segments 22, 24, 26 and 28.

End coupling 46 is a port that receives the hot air from the flexible conduit 16 (see FIG. 1), while an end plate 84 closes the downstream end of support 12.

Figure 3:
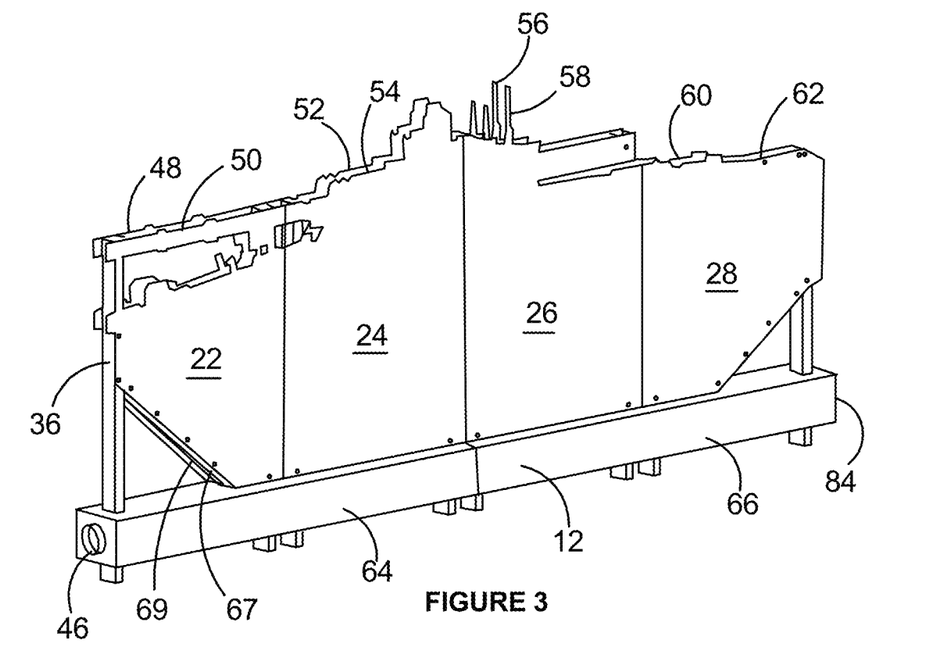
FIG. 3 shows a perspective view of the target structure of FIG. 1.

As best shown in FIG. 3, the target structure 10 is generally planar. Each of the structure segments 22, 24, 26 and 28 has a generally planar back face and a generally planar front face (48, 50, 52, 54, 56, 58, 60 and 62 respectively) of sheet material spaced apart by a core framework sandwiched there between.

Figure 4:
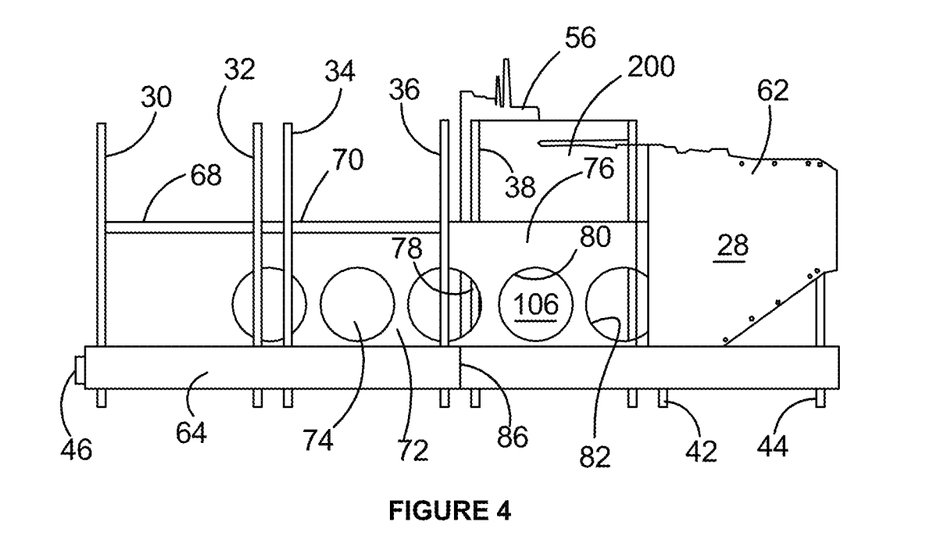
FIG. 4 shows a side view of the target structure of FIG. 1 but with some of the front and back faces removed to illustrate the internal construction of the target structure.
Figure 5:
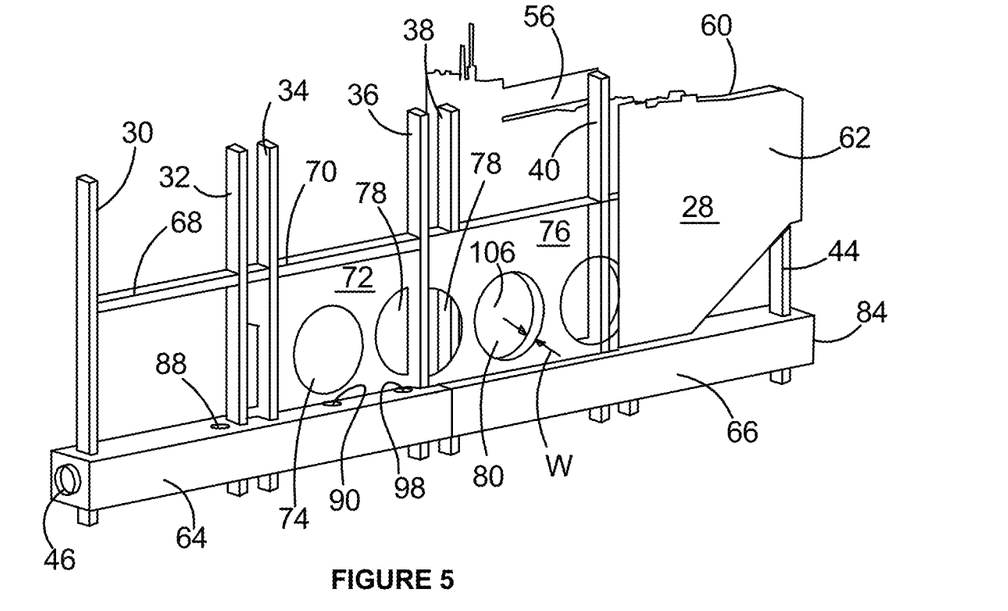
FIG. 5 shows a perspective view of the target structure of FIG. 4.

As best shown in FIGS. 4 and 5, it can be seen that the core framework for segment 22 comprises mounting struts 30 and 32, separated by cross member 68. Additional side wall sections are positioned on the lower portion of the back face 48 and front face 50 respectively. However, these have been omitted in the interests of clarity.

In FIGS. 4 and 5, a side wall insert 72 is shown as forming part of the structure of segment 24. The side wall insert 72 is attached about its edges to the mounting struts 34 and 36, and to the cross member 70, such as by stapling. Then, the back face 52 is attached to the insert 72 such as by gluing. The side wall insert 72 includes an aperture 74, which corresponds to the size and position of one of the wheels of a tank. The aperture 74 of the side wall insert 72 is provided to change the conduction of heat to the exterior surface of the back face 52 as compared to the conduction of heat in the sections of the side wall insert 72 that surround the aperture 74. This is because the sections of the side wall insert 72 that surround the aperture 74 will be thicker than the aperture 74 and so less heat will reach the external surface of the target structure 10 in those thicker sections than in the aperture sections. In this manner, the thermal image produced in the structure segment 22 can be arranged to more closely replicate the real world thermal image that would be produced by a real world tank.

It is to be noted that each of the back and front faces 52 and 54 can have a side wall insert applied to them, or just one of the faces can have a side wall insert. Also, where each of the back and front faces 52 and 54 has a side wall insert applied to them, the respective inserts can be identical or not identical. Non-identical inserts would be applicable where the typical thermal profile of the vehicle being imitated differs when viewed from the left and right sides.

The side wall insert 72 is one of several like inserts in other structure segments which each include an aperture so that the wheels of a tank can be mimicked as required. Thus, a like insert is applied to the lower portion of the front face 54 of the structure segment 24 of the target structure 10 while like inserts are also applied to the front and back faces of other structure segments. See apertures 78, 80, and 82 in the other structure segments. As such, all of the wheels of a tank can be mimicked as required. Importantly, if the number of wheels of a tank is a characteristic that distinguishes an enemy tank from a friendly tank, that characteristic is important in training operations to be able to recognise.

Referring to FIG. 5, it can be seen that the flow rate of hot air to each of the segments 22, 23, 24, 26 and 28 (see FIG. 2) may be varied so that the warmest parts of the real world object are simulated by sections receiving a higher volume of hot air. Segment 22 is at the front of the tank and furthest from the engine and engine exhaust (in a real world tank) and therefore will be a less heated section of a tank. Segment 22 thus receives heated air from a single outlet 88 of the support 12. Furthermore, the inlet into the cavity of the end segment 22 is the open bottom of segment 22 that is formed between the lower edges of the back face 48 (see FIG. 3) and the front face 50 (see FIG. 3). Heated air from the outlet 88 has a flow path rising up within the cavity to the cross member 68, after which it flows towards the front of the tank before venting from an outlet 67 formed in the angled front frame member 69. The thermal image for segment 22 will not be as bright as the other segments 24, 26 and 28 which have different flow paths and constructions. In particular, the tank wheel apertures 74, 78, 80, and 82 in the side wall inserts will be brighter, which mimics the case in a real world tank.

Segment 24 is supplied with heated air from outlets 90 and 98 (see FIG. 5). The segment 24 will thus receive a greater volume of heated air than the segment 22. Given that the heated fluid medium dissipates energy as it travels further from the end coupling 46, the segments closest to the end coupling 46 typically present a brighter thermal image. Thus, segment 22 will be normally present the brightest thermal image, then segment 24, then segment 26 and finally segment 28. Adjusting the size and number of inlets and outlets to the segments goes some way to overcoming the visible effect of the natural dissipation of energy. It will be appreciated that cross members 68 and 70 and/or mounting struts 30, 32, 34, 36 can include vent holes to assist with the configuration of the hot air flow through the cavities in these segments.

Figure 7:
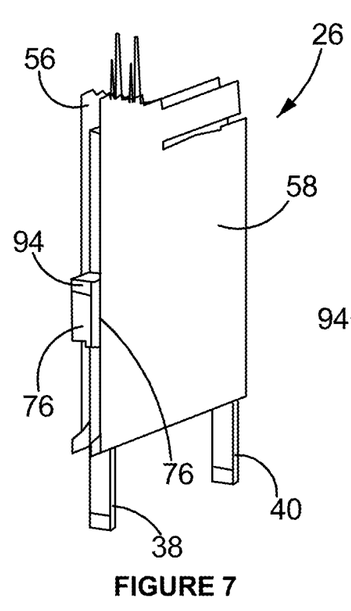
FIG. 7 shows a single segment of the target structure of FIG. 1 in perspective view.

FIG. 5 shows the pair of side wall inserts 76 and 96 that are spaced apart for attachment to the respective front and back faces 56 and 58 of the segment 26 and in particular shows the relatively narrow width W of the chamber 106 between the side wall inserts 76 and 96 (see FIG. 7). This promotes the fluid flow that is predominantly 2 dimensional and therefore easier to configure and predict.

Figure 8:
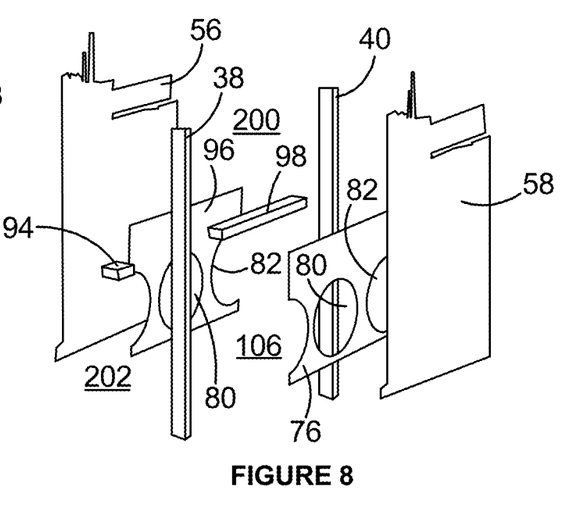
FIG. 8 is an exploded view of the single segment of FIG. 7.

FIGS. 7 and 8 clarify the sandwich structure of each of the segments 22, 24, 26 and 28. The back face 56 and front face 58 are provided by a suitable sheet material, such as plywood, which is reasonably inexpensive and easy to shape. However, other sheet materials of metal, polymer or laminates of different materials may be used. Adjacent the front face 58 and back face 56 are the side wall inserts 76 and 96 respectively. Conveniently these may also be profiled from plywood sheets, but once again other suitable sheet materials may be used. These side wall inserts 76 and 96 serve to increase the wall thickness in specific regions of the front face 58 and back face 56. Areas of greater thickness are more insulated against travel of heat to the exterior surface of the front and back faces 58 and 56 so that the exterior surface temperature is less than thinner areas, such as the apertures 80, 80', 82 and 82'.

FIGS. 7 and 8 also illustrate that the segment 26 defines several cavities, as well as part of one or more cavities in an adjacent target segment. In particular, target segment 26 defines the lower cavity 106 (see also FIG. 5), and an upper cavity 200 above the cross member 98, and part of a cavity 202 in adjacent target segment 24. Cross member 98 defines the top of lower cavity 106, which may or may not include vents through to the upper cavity 200. The open bottom of the lower cavity 106 provides the inlet to the cavity of the segment 26 to receive hot air from an outlet or outlets in the support 12 (see FIG. 4).

As best shown in FIG. 7, the side wall inserts 76 and 96 extend past the engagement element 38 to provide part of the lower cavity 202 in the segment 24. Partial cross member 94 provides part of the cross member defining the top of the cavity 202.

Figure 6:
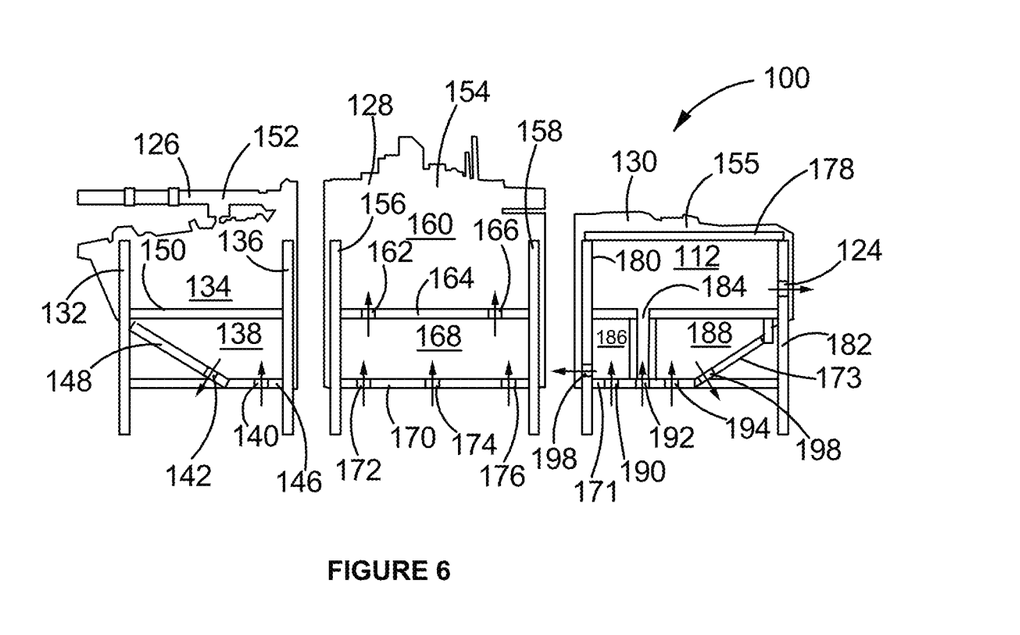
FIG. 6 shows another embodiment of a target structure according to the present invention.

FIG. 6 shows another embodiment of a structure according to the present invention. The target structure 100 has three segments 126, 128 and 130. For the purposes of illustration, the front face has been removed to reveal the back faces 152, 154 and 155, and the internal spacer framework for each of the segments. In this form of the target structure 100, the lower cavities 138, 168, 186 and 188 are each closed at the bottom by frame members 148, 146, 170, 171 and 173. This is distinguished from the cavities being open at the bottom such as in the cavities 22, 24, 26 and 28 of the target structure 10.

The frame members 148, 146, 170, 171 and 173 are in abutment with or rest on the support 12 (not shown, but the same as illustrated in the earlier figures) and include inlet apertures for receiving a flow of hot air that corresponds to the thermal image brightness level required for the cavities in each segment. As previously discussed, the front of a real world tank is furthest from the engine but some heat is generated by the front wheels against the tank tracks. Thus, the thermal image generated in the segment 126 is intended to be less bright than in other segments of the target structure 100. As indicated above however, heated fluid medium will enter the segment 126 from the support 12 in advance of the other segments and so the thermal image presented in the respective segments is controlled by the number and size of the inlets and outlets of each segment. In light of this, the support engagement struts 132 and 136 slot into apertures in the support 12 (not shown) so that the single inlet 140 in the frame member 146 is in registration with a hot air outlet. As indicated by the flow arrows, hot air flows into the lower cavity 138 where the structure of the framework and the cross member 150 guided that air through an arc and so that the air flows out of the vent 142 in the frame member 148 as indicated by the flow arrows. The flow arrow through the vent 142 does not have a solid colour arrow head to indicate a degree of heat dissipation into the front and back faces, thereby generating part of the thermal image of the segment 126.

The cross member 150 defining the bottom of the upper cavity 134 and the top of the lower cavity 138 has no vents, ensuring that the upper portion of the segment 126 of the target structure 100 is not directly heated by the airflow into the cavity 138 and accordingly, the segment 126 maintains low brightness which accords with the thermal image of a real tank.

On the other hand, the sections of a real tank that would generate a brighter thermal image correspond to target segments 128 and 130. Accordingly, the structure of those cavities and of the support 12 on which they rest, is such that a greater amount of heated air flows into the cavities. This is achieved the segment 128 by having three inlets 172, 174 and 176. These inlets are spaced to roughly correspond with the tank wheel spacing. Also, in the cross member 164, vents 162 and 166 are provided and positioned such that the hot air flow path through the cavity 168 mimics a thermal signature from heat generated by friction between the wheels and the tank track.

In the upper cavity 160 of segment 128, air from the vents 162 and 166 provide a thermal signature replicating the heat generated by systems and equipment in this section of a real tank.

Segment 130 replicates the thermal image generated by the engine within a real tank. This segment has three separate cavities 112, 186 and 188 supplied with hot air from closely spaced inlets 190, 192 and 194. The relatively small internal volume of cavity 186 and the size and location of the inlet, ensures that it appears as a bright area in the thermal image, which reflects the heat generated by the engine, as well as the tank tracks against the wheels. The vent 196 feeds hot air between the support struts 158 and 180 to transition the thermal gradient between the two adjacent segments 128 and 130.

The structure of the framework of the segment 130 directs hot air from inlet 192 through a channel 184 to the cavity 112. Here the hot air follows the top cross member 178 through to the vent 124, positioned to replicate the exhaust plume for a tank.

In the lower cavity 188, hot air from the inlet 194 has a curved flow path and exits through flow vent 198 to mimic the thermal signature of the wheels of a real tank and also takes into account the proximity to the engine.

It will be understood that the size and shape of the cavities, the inlets and the vents may be customised to further refine the intensity of heat by the amount of heat introduced into the respective cavities and by the fluid flow paths within the cavities in order to ultimately improve and refine the accuracy of the simulated thermal image. Furthermore, the segments may use materials selected for their thermal properties to more closely simulate the thermal image. For example, a paint or other coating may be applied to internal or external surfaces, or inexpensive polymers, composites or laminates may be used for particular components within the target structure 10. Materials can be selected for example based on their heat conductive or reflective properties.

Figure 9A:
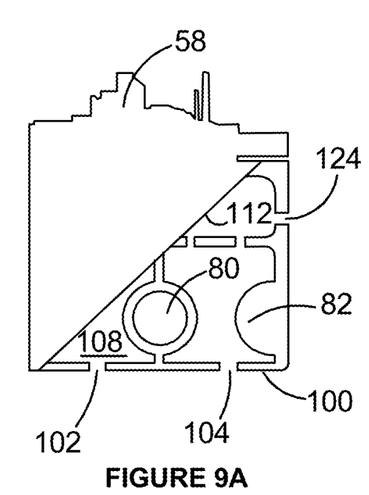
FIG. 9a shows a part cut-away view of a segment of the target structure of FIG. 1 in side view.
Figure 9B:
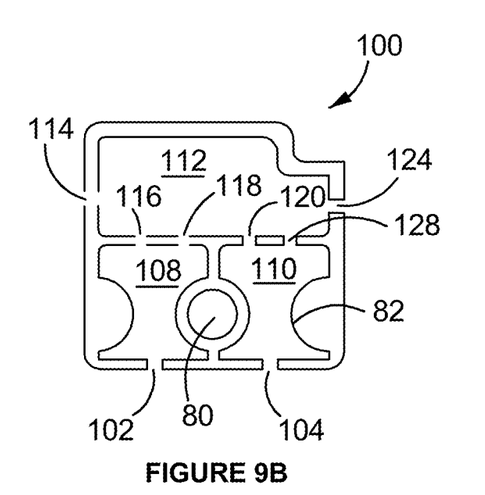

Referring to FIGS. 9a and 9b, the internal spacer framework can include a unitary core insert 100 for ease of construction and to accommodate relatively complex flow patterns. FIG. 9a shows the target segment 26 with the front face partially removed to reveal the unitary insert 100 beneath. The pressed insert 100 provides multiple cavities 108, 110 and 112, as well as relatively detailed internal features, such as wheels 80 and 82. Forming the insert from cork, pressed saw dust, HDPE, or recycled coconut shells/ husk provides low cost production in high volumes. HDPE has particular advantages in that it has export benefits as not comprising exotic or organic materials, it has good weather resistance, a long shelf life, and it is highly recyclable. It can also exhibit self-repairing properties after having been shot, and has other desirable characteristics. The core insert 100 attaches to the inside surfaces of each of the front and rear faces 58 and 56, such as by gluing. Alternatively, the core insert 100 can simply press against the inside surfaces of the front and rear faces 58 and 56.

Furthermore, the location and size of inlets 102 and 104 may be closely controlled as is the size and distribution of the vents 114 to 124. Sizing the insert 100, such that at least two opposing sides correspond with the spacing between opposing edges of the front face 58, allows the assembly of each segment to be fast and in accurate registration with the front and back face.

Figure 10:
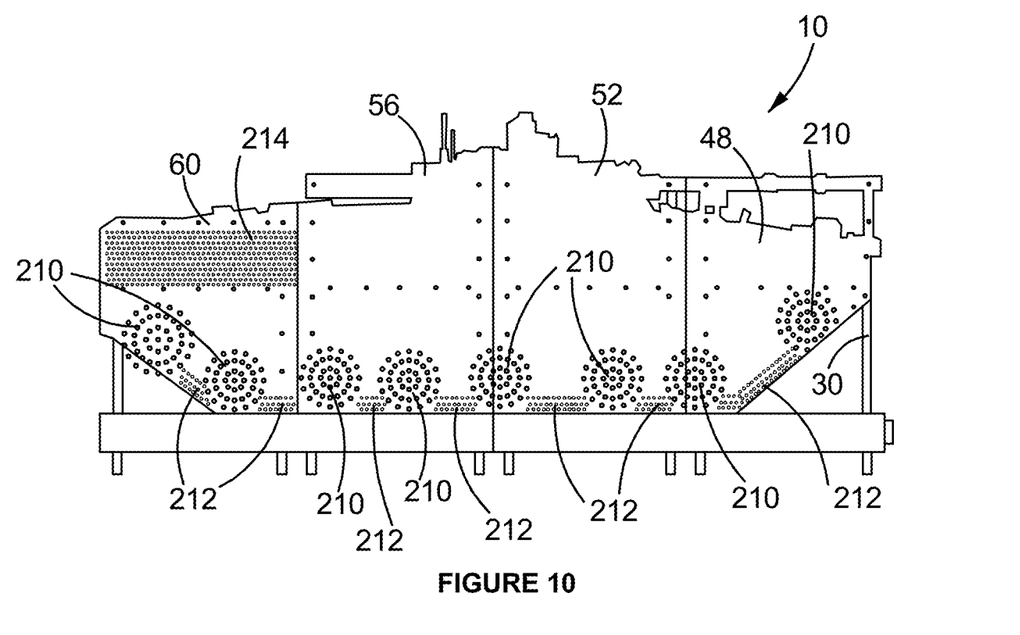
FIG. 10 illustrates a perforation pattern applied though the back faces of the target structure of FIG. 1.
Figure 11:
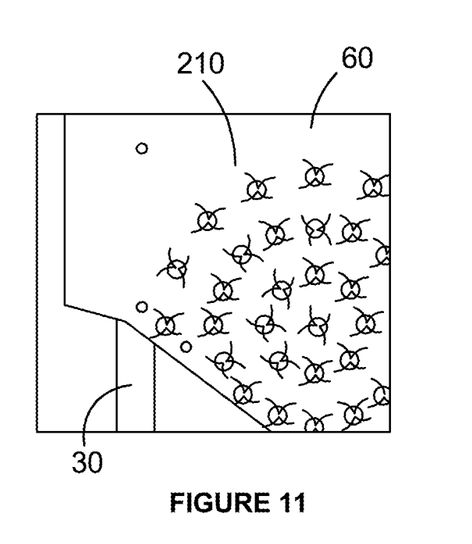
FIG. 11 shows a close up of a section of the circular perforations of FIG. 10.
Figure 12:
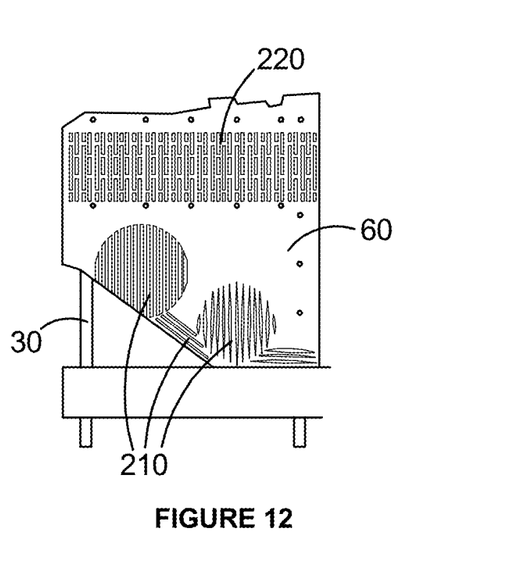
FIG. 12 shows an alternative perforation pattern applied though the back faces of the target structure of FIG. 1.

An alternative venting arrangement is illustrated in FIGS. 10, 11 and 12. FIG. 10 shows the target structure 10 of FIG. 1 but from the opposite side. FIG. 10 illustrates a perforation pattern applied though the back faces 48, 52, 56 and 60. The perforations are provided in circular formations 210 where the wheels of the real world tank would be positioned, while linear sections 212 are provided where the tracks of the wheels would be positioned and finally, further linear sections 214 are provided where the engine would be positioned. The perforations themselves are also shown as circular, although they can be any suitable shape, such as shown by the elongate cut-outs 210 and 220 of FIG. 12.

FIG. 11 shows a close up of a section of the circular perforations 210 at the engine end of the target structure 10. FIG. 11 shows how fluid medium is intended for discharge from the individual perforations and shows that the fluid medium will tend to egress from each perforation about the entire perforation and to thus transfer thermal energy to the actual external surface of the body.

The perforation pattern shown in FIGS. 10 and 11 can be used in conjunction with the internal spacer framework of the earlier figures, such as the unitary core insert 100 of FIGS. 9a and 9b. The core insert might only be used to establish a spacing or volume within a segment, so that the size and location of the perforations sets the form of thermal image that will be created in the segment, or the core can also function to set or influence the thermal image.

FIG. 12 shows a number of different shaped cut-outs or perforations 220 forming a venting arrangement, to illustrate that the cut-outs or perforations can be formed in any suitable geometric shape. In FIG. 12, the cut-outs or perforations are generally linear.

The selected shape of the cut-outs or perforations can be affected by production parameters as, for example, machining time can be affected by the total number of cut-outs or perforations (as is that case with laser cutting/water jet cutting where the laser beam or water jet needs to first pierce the workpiece before cutting the geometry), there may be production efficiency gains by using one larger cut-out in place of multiple smaller cut-outs. The use of cut-outs or perforations can be combined with variations in wall thickness of the wall of a panel or segment, whereby a thicker wall may strengthen the areas where significant cut-outs or perforations are present, or it may add bulk to achieve thermal mass.

In addition, the cut-outs or perforations are not required to be uniform in shape as they extend through the surface of the wall of a panel or segment. Accordingly, the cut-outs or perforations may expand or contract from one side of a panel or segment to the other. For example, a cut-out that is larger on the inside surface of the wall of a panel or segment than it is at the outside surface would allow the internal surface wall surface area to be increased (which would increase transfer of thermal energy from the fluid medium), while the smaller size cut-out at the outside surface would aid in preventing the volume of fluid medium from exhausting from the panel or segment too quickly.

Another production technique involves moulding and joining two 3 dimensional multi-cavity shells which may or may not be mirror images of one another. While remaining a generally planar overall structure, the shells would be moulded into a geometry that allows the fluid medium, such as air, to follow the desired flow paths. Furthermore, moulding techniques are suited to varying wall thicknesses for different levels of thermal conduction and can integrally form the support engagement struts for attachment to the support 12. The two moulded shells would take the place of the three part construction of segments described above. That is, they would take the place of the planar front and rear faces 52 and 54 and the timber cross member 70 of the segment 24 for example, Workers in this field will understand that moulding two opposing halves of a segment or the entire target structure could dramatically reduce production times. In a similar production technique, the front and back 3 dimensional shells are formed of plywood profiled using a hydraulic hot press.

The invention has been described herein by way of example only. Skilled workers will readily recognise many variations and modifications which do not depart from the spirit and scope of the broad inventive concept.

The invention claimed is:

1. A target structure for simulating a thermal image generated by a real world object, the target structure comprising:
   a body formed to have the general physical appearance of the real world object it is to mimic from one viewing aspect and having at least one internal cavity;
   at least one cavity inlet opening into the cavity for receiving a flow of fluid medium into the cavity, the fluid medium having a temperature that differs from ambient; wherein
   the cavity having an internal configuration for the fluid medium to cause temperature variations on an external surface of the body to simulate the thermal image of the real world object, and
   the cavity having a wall section with areas of differing thermal conduction.

2. A structure according to claim 1, the structure including a detachable support for supporting the body in a defined orientation.

3. A structure according to claim 2, the support being a long beam that extends from one end of the body to the other.

4. A structure according to claim 2, the support facilitating delivery of fluid medium to the cavity inlet.

5. A structure according to claim 4, the support including a delivery conduit and at least one fluid medium outlet, the outlet being in fluid communication with the cavity inlet.

6. A structure according to claim 5, the support being hollow and the delivery conduit being the interior of the support.

7. A structure according to claim 1, the structure being in fluid communication with a remote source of fluid medium which is part of a towing vehicle or trailer.

8. A structure according to claim 7, the fluid medium being delivered from the remote source of fluid medium to the cavity inlet by fan force.

9. A structure according to claim 1, the fluid medium being hot air.

10. A structure according to claim 1, comprising two or more bodies that each includes at least one cavity.

11. A structure according to claim 10, the bodies being positioned close adjacent each other, forming segments of the structure.

12. A structure according to claim 1, the body being generally 2 dimensional.

13. A structure according to claim 1, the body including one or more cavity outlets and the cavity outlets being perforations in a wall of the body.

14. A structure according to claim 1, the wall section has variable thickness to form the areas of differing thermal conduction.

15. A structure according to claim 1, the wall section has differing wall material to form the areas of differing thermal conduction.

16. A structure according to claim 1, the body having a front face, and a back face spaced from the front face, but parallel to the front face and the cavity within the body being defined by inside surfaces of the front and back faces so that the cavity has planar and parallel inside facing surfaces.

17. A structure according to claim 16, the inside surfaces of the front and back faces being separated by a core structure which defines the cavity within the body.

18. A structure according to claim 1, the fluid flow within the cavity being predominantly 2 dimensional.

19. A method of simulating a thermal image generated by a real world object, the method comprising:
   a. providing a target structure comprising a body formed to have the general physical appearance of the real world object it is to mimic from one viewing aspect and having at least one internal cavity, the body having at least one inlet opening into the cavity for receiving a flow of fluid medium into the cavity, the cavity having an internal configuration for the fluid medium to cause temperature variations on an external surface of the body that simulates the thermal image of the real world object and the cavity having a wall section with areas of differing thermal conduction; and
   b. delivering fluid medium to the inlet cavity, the fluid medium having a temperature that differs from ambient.

* * * * *